United States Patent
Vaikar et al.

(10) Patent No.: US 9,235,588 B1
(45) Date of Patent: Jan. 12, 2016

(54) SYSTEMS AND METHODS FOR PROTECTING DEDUPLICATED DATA

(75) Inventors: Amol M. Vaikar, Maharashtra (IN); Mandar V. Khanolkar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 670 days.

(21) Appl. No.: 12/981,144

(22) Filed: Dec. 29, 2010

(51) Int. Cl.
*G06F 17/30* (2006.01)
*G06F 3/06* (2006.01)

(52) U.S. Cl.
CPC .......... *G06F 17/3015* (2013.01); *G06F 3/0641* (2013.01)

(58) Field of Classification Search
CPC ............................. G06F 17/3015; G06F 3/0641
USPC .......... 707/640, 651, 664, 692, 812, 999.101, 707/999.2–999.204
See application file for complete search history.

(56) References Cited

U.S. PATENT DOCUMENTS

| | | | | |
|---|---|---|---|---|
| 5,537,585 | A * | 7/1996 | Blickenstaff et al. | |
| 6,826,665 | B1 * | 11/2004 | Nambu | 711/162 |
| 6,862,604 | B1 * | 3/2005 | Spencer et al. | 707/802 |
| 7,225,211 | B1 * | 5/2007 | Colgrove et al. | 707/693 |
| 7,539,709 | B1 * | 5/2009 | Vengerov et al. | |
| 7,603,337 | B2 * | 10/2009 | Suzuki | |
| 7,624,241 | B2 * | 11/2009 | Eguchi et al. | 711/162 |
| 7,779,097 | B2 * | 8/2010 | Lamkin et al. | 709/223 |
| 7,822,939 | B1 * | 10/2010 | Veprinsky et al. | 711/170 |
| 7,953,928 | B2 * | 5/2011 | Smoot et al. | 711/114 |
| 7,996,409 | B2 * | 8/2011 | Hsu et al. | 707/748 |
| 8,122,017 | B1 * | 2/2012 | Sung et al. | 707/723 |
| 8,176,269 | B2 * | 5/2012 | Jaquette et al. | 711/156 |
| 8,229,897 | B2 * | 7/2012 | Cannon et al. | 707/679 |
| 8,370,597 | B1 * | 2/2013 | Chatterjee et al. | 711/170 |
| 8,396,838 | B2 * | 3/2013 | Brockway et al. | 707/662 |
| 2002/0059539 | A1 * | 5/2002 | Anderson | 714/6 |
| 2003/0046270 | A1 * | 3/2003 | Leung et al. | 707/1 |
| 2007/0027929 | A1 * | 2/2007 | Whelan | 707/200 |
| 2007/0050589 | A1 * | 3/2007 | Tanaka et al. | 711/165 |
| 2007/0112875 | A1 * | 5/2007 | Yagawa | 707/200 |
| 2007/0143365 | A1 * | 6/2007 | D'Souza et al. | 707/203 |
| 2007/0185934 | A1 * | 8/2007 | Cannon et al. | 707/204 |
| 2007/0233987 | A1 * | 10/2007 | Maruyama et al. | 711/165 |
| 2009/0070382 | A1 * | 3/2009 | Agrawal et al. | 707/200 |
| 2009/0204650 | A1 * | 8/2009 | Wong et al. | 707/204 |
| 2010/0114974 | A1 * | 5/2010 | Jung et al. | 707/802 |

(Continued)

OTHER PUBLICATIONS

Xiaozhou Li et al., Reliability Analysis of Deduplicated and Erasure-Coded Storage, Hewlett-Packard Laboratories, http://hotmetrics.cs.caltech.edu/pdfs/paper16.pdf, as accessed on Oct. 22, 2010.

*Primary Examiner* — Grace Park
(74) *Attorney, Agent, or Firm* — ALG Intellectual Property, LLC

(57) ABSTRACT

A computer-implemented method for protecting deduplicated data may include (1) identifying a deduplicated data system, (2) identifying a tiered storage system for storing deduplicated objects of the deduplicated data system, (3) assigning a level of priority to at least one deduplicated object within the deduplicated data system based on at least one property of the deduplicated object, (4) selecting a storage tier within the tiered storage system for storing the deduplicated object based on the level of priority, and then (5) storing the deduplicated object within the selected storage tier. Various other methods, systems, and computer-readable media are also disclosed.

20 Claims, 7 Drawing Sheets

(56) References Cited

U.S. PATENT DOCUMENTS

2010/0121828 A1* 5/2010 Wang ............................ 707/694
2010/0223495 A1* 9/2010 Leppard .......................... 714/6
2010/0250627 A1* 9/2010 Tabata et al. .................. 707/812
2010/0306175 A1* 12/2010 Johnson et al. ............... 707/663

* cited by examiner

SYSTEMS AND METHODS FOR PROTECTING DEDUPLICATED DATA

BACKGROUND

Deduplicated data systems are often able to reduce the amount of space required to store files by recognizing redundant data patterns. For example, a deduplicated data system may reduce the amount of space required to store similar files by dividing the files into data segments and storing only unique data segments. In this example, each deduplicated file may simply consist of a list of data segments that make up the file.

Unfortunately, while conventional deduplicated data systems may reduce the space required to store files, these deduplicated data systems may also reduce storage reliability. For example, if one hundred files each reference a single unique data segment, the loss and/or corruption of the single data segment within the deduplicated data system may result in the loss and/or corruption of all one hundred files.

Traditional approaches for protecting data loss may include duplicating the data to be protected. However, duplicating all of the data within a deduplicated data system may contravene the primary purpose of the deduplicated data system. Accordingly, the instant disclosure addresses a need for additional and improved systems for protecting deduplicated data.

SUMMARY

As will be described in greater detail below, the instant disclosure generally relates to systems and methods for protecting deduplicated data by dynamically storing deduplicated data objects (e.g., deduplicated files and/or deduplicated blocks) in different storage tiers based on the importance of each deduplicated data object. In one example, an exemplary method for accomplishing such a task may include (1) identifying a deduplicated data system, (2) identifying a tiered storage system for storing deduplicated objects of the deduplicated data system, (3) assigning a level of priority to at least one deduplicated object within the deduplicated data system based on at least one property of the deduplicated object, (4) selecting a storage tier within the tiered storage system for storing the deduplicated object based on the level of priority, and then (5) storing the deduplicated object within the selected storage tier.

The deduplicated data system may deduplicate data by deduplicating files (e.g., storing only one copy of a file stored by multiple users) and/or by deduplicating data segments within files (e.g., storing only unique data segments within files and constituting files with references to the unique data segments). Accordingly, the deduplicated object may include a deduplicated file and/or a deduplicated data segment.

In some examples, the tiered storage system may be tiered by storage device reliability. Each storage tier (including the selected storage tier) may include a physical storage device and/or a logical storage device.

The systems described herein may use any of a variety of properties to assign the level of priority to the deduplicated object. For example, the systems described herein may assign the level of priority based on a reference count of the deduplicated object, a measurement of how long ago a reference count of the deduplicated object changed, an access time of the deduplicated object, a user-assigned priority, and/or a priority of at least one owner of the deduplicated object.

In some examples, the deduplicated data system may provide storage to a backup system. In these examples, storing the deduplicated object within the selected storage tier may entail backing up the deduplicated object to the storage tier.

By dynamically storing deduplicated data objects in different storage tiers based on the priority of each deduplicated data object, the systems and methods described herein may increase the reliability of deduplicated storage (e.g., by storing a highly-referenced data segment in a more reliable storage tier) without the costs associated with duplicating the deduplicated data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
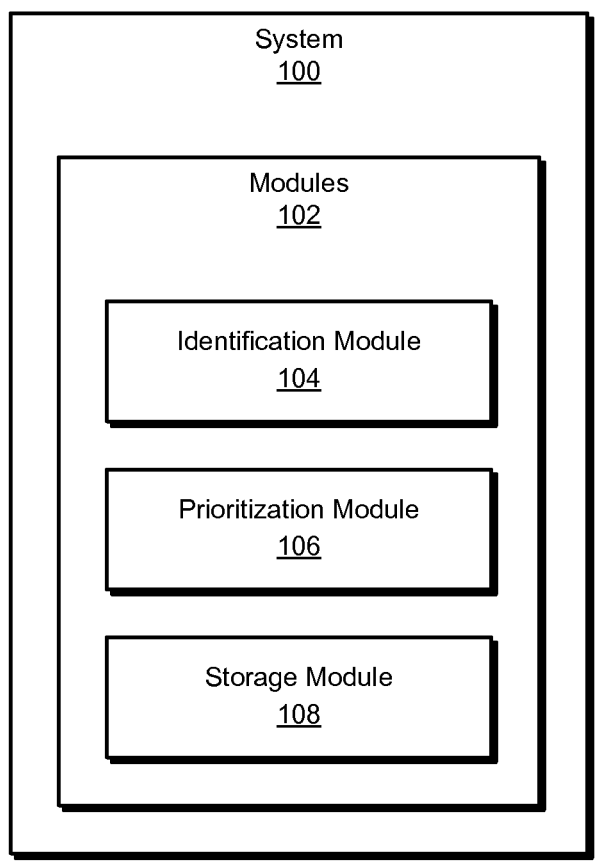
FIG. 1 is a block diagram of an exemplary system for protecting deduplicated data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
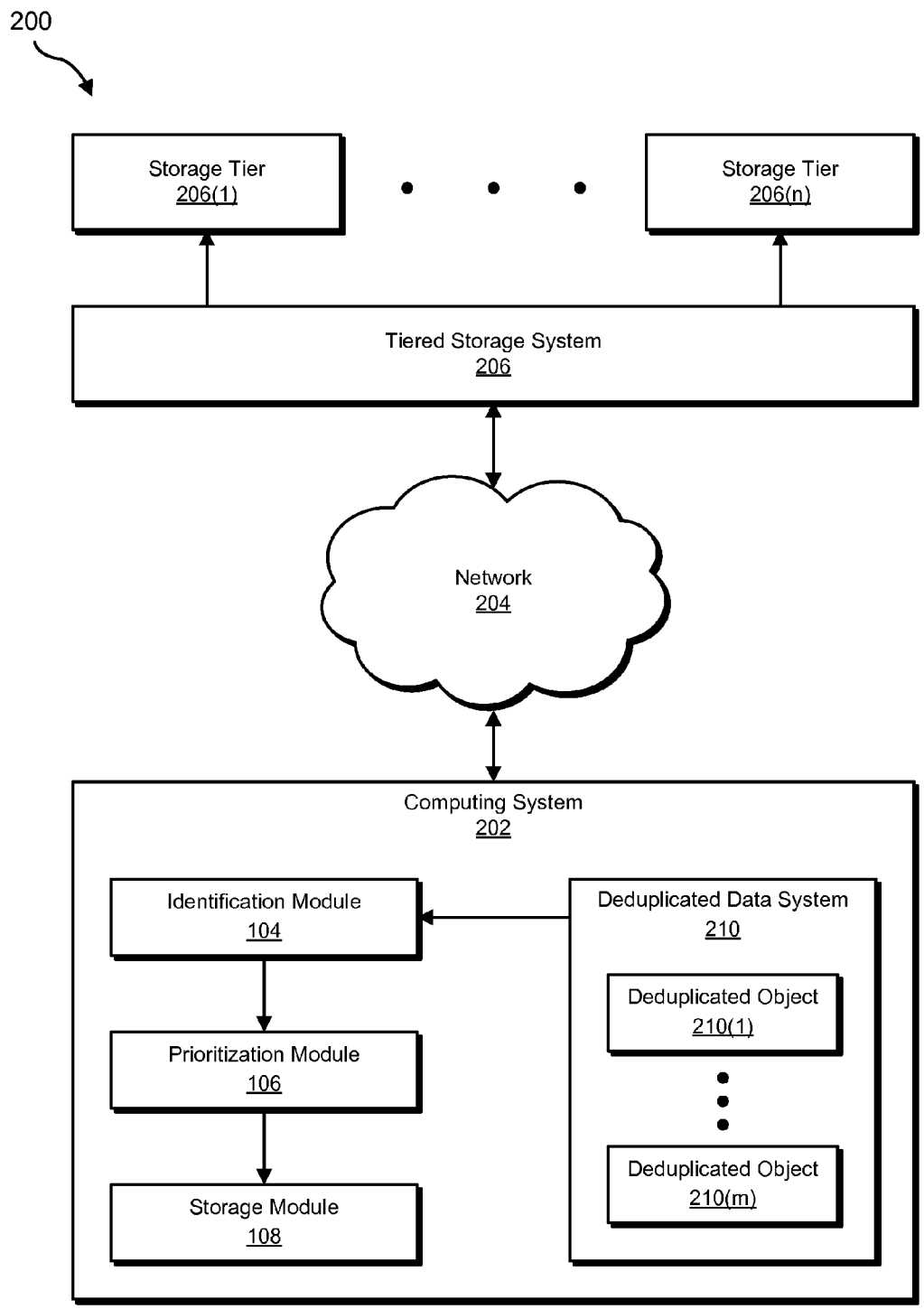
FIG. 2 is a block diagram of an exemplary system for protecting deduplicated data.
Figure 3:
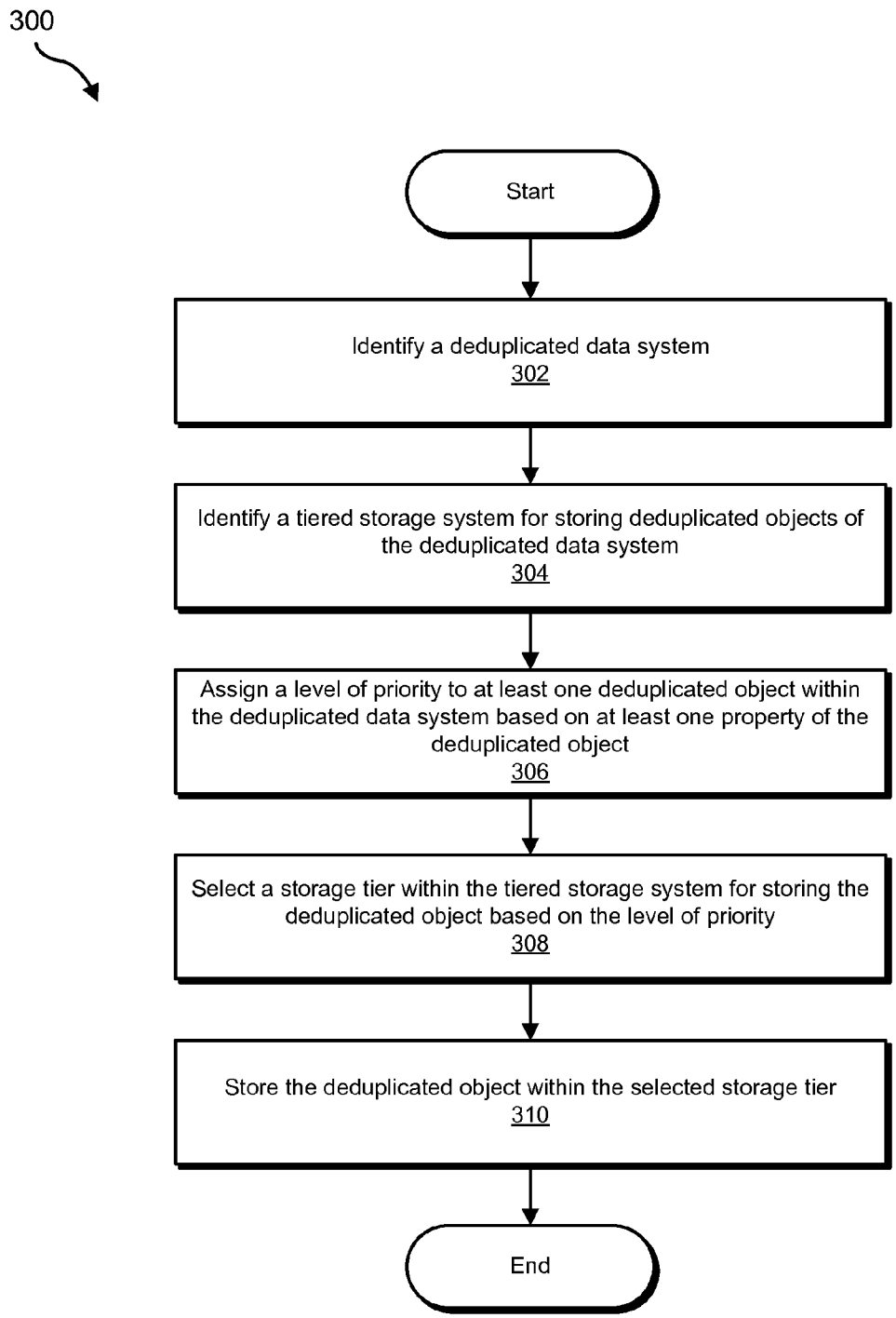
FIG. 3 is a flow diagram of an exemplary method for protecting deduplicated data.
Figure 4:
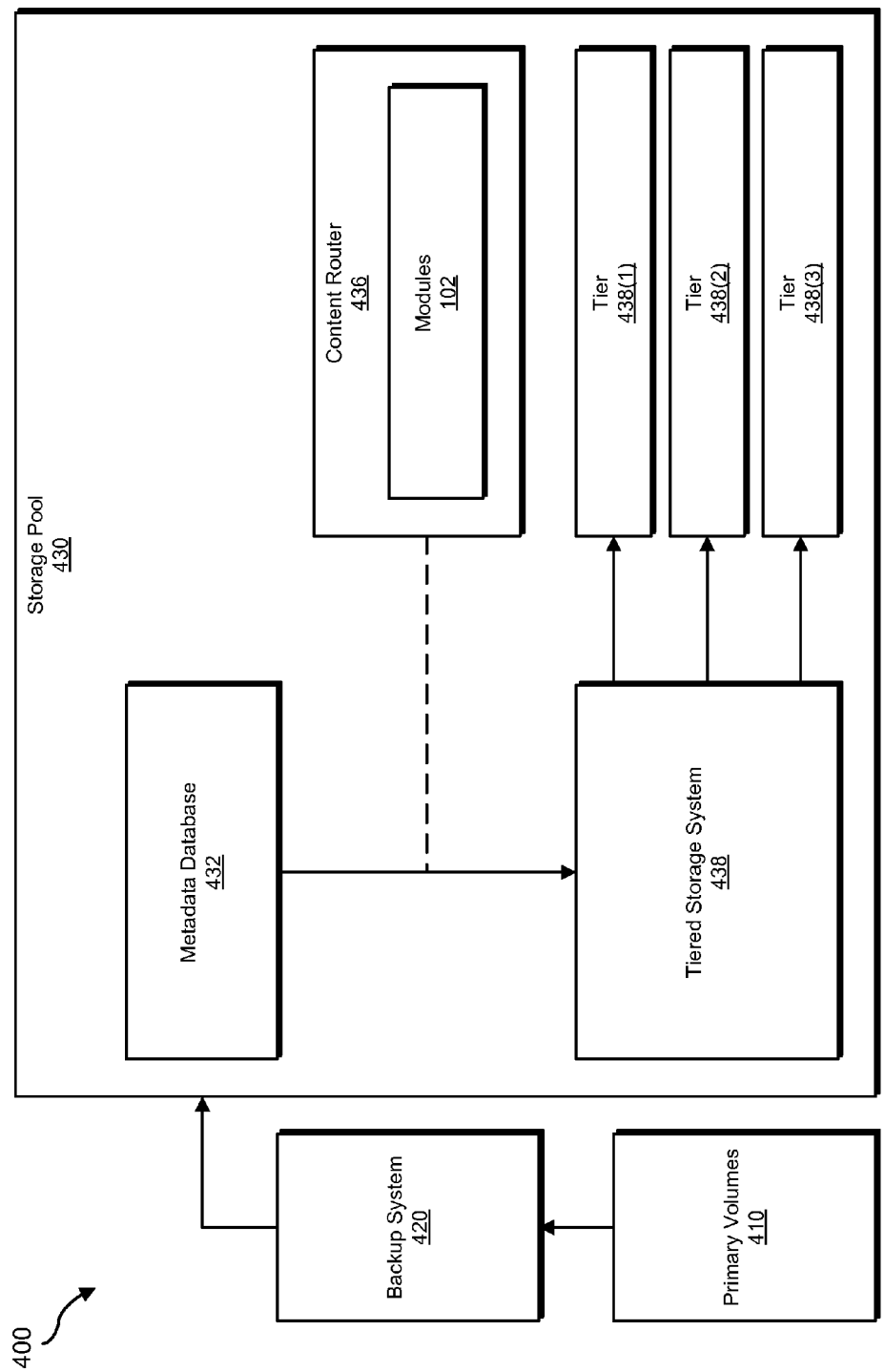
FIG. 4 is a block diagram of an exemplary system for protecting deduplicated data.

The following will provide, with reference to FIGS. 1, 2, and 4, detailed descriptions of exemplary systems for protecting deduplicated data. Detailed descriptions of corresponding computer-implemented methods will also be provided in connection with FIG. 3. Detailed descriptions of an exemplary deduplicated data system will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for protecting deduplicated data. As illustrated in this figure, exemplary system 100 may include one or more modules 102 for performing one or more tasks. For example, and as will be explained in greater detail below, exemplary system 100 may include an identification module 104 programmed to (1) identify a deduplicated data system and (2) identify a tiered storage system for storing deduplicated objects of the deduplicated data system. Exemplary system 100 may also include a prioritization module 106 programmed to (1) assign a level of priority to at least one deduplicated object within the deduplicated data system based on at least one property of the deduplicated object and (2) select a storage tier within the tiered storage system for storing the deduplicated object based on the assigned level of priority.

In addition, and as will be described in greater detail below, exemplary system 100 may include a storage module 108 programmed to store the deduplicated object within the selected storage tier. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or tiered storage system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a tiered storage system 206 via a network 204.

In one embodiment, and as will be described in greater detail below, modules 102 from FIG. 1 may program computing system 202 to dynamically store one or more deduplicated data objects of a deduplicated data system 210 to tiered storage system 206 by (1) identifying a deduplicated data system (e.g., deduplicated data system 210), (2) identifying a tiered storage system (e.g., tiered storage system 206) for storing deduplicated objects of the deduplicated data system (e.g., deduplicated objects 210(1)-(m)), (3) assigning a level of priority to at least one deduplicated object within the deduplicated data system based on at least one property of the deduplicated object (e.g., assigning a level of priority to deduplicated object 210(1) based on at least one property of deduplicated object 210(1)), (4) selecting a storage tier within the tiered storage system for storing the deduplicated object based on the level of priority (e.g., a storage tier 206(1)), and then (5) storing the deduplicated object within the selected storage tier (e.g., storing deduplicated object 210(1) to storage tier 206(1)).

Computing system 202 generally represents any type or form of computing device capable of reading computer-executable instructions. Examples of computing system 202 include, without limitation, laptops, desktops, servers, appliances, cellular phones, personal digital assistants (PDAs), multimedia players, embedded systems, combinations of one or more of the same, exemplary computing system 610 in FIG. 6, or any other suitable computing device.

As illustrated in FIG. 2, computing system 202 may also include deduplicated data system 210. Deduplicated data system 210 may represent portions of a single database or computing device or a plurality of databases or computing devices. For example, deduplicated data system 210 may represent a portion of tiered storage system 206 in FIG. 2, computing system 610 in FIG. 6, and/or portions of exemplary network architecture 700 in FIG. 7. Alternatively, deduplicated data system 210 may represent one or more physically separate devices capable of being accessed by a computing device, such as computing system 202 in FIG. 2, tiered storage system 206 in FIG. 2, computing system 610 in FIG. 6, and/or portions of exemplary network architecture 700 in FIG. 7.

Tiered storage system 206 generally represents any type or form of storage system that is capable of providing storage services at distinct storage tiers. Tiered storage system 206 may include storage tiers 206(1)-(n). Each storage tier within tiered storage system 206 may represent portions of a single storage device or a plurality of storage devices.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202 and tiered storage system 206.

FIG. 3 is a flow diagram of an exemplary computer-implemented method 300 for protecting deduplicated data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a deduplicated data system. For example, at step 302 identification module 104 may, as part of computing system 202 in FIG. 2, identify deduplicated data system 210.

As used herein, the phrase "deduplicated data system" generally refers to storage systems that reduce redundant data by only storing a single instance of data (e.g., a data segment, a file, etc.), potentially referencing each data instance multiple times. Additionally or alternatively, "deduplicated data system" may refer to a portion of such a system. For example, a "deduplication data system" may refer to a deduplication engine, a database for metadata relating to deduplicated content, a content router for storing and/or directing deduplicated data, and/or one or more servers, appliances, and/or other computing devices for performing deduplication functions. Examples of deduplicated data systems may include SYMANTEC NETBACKUP PUREDISK.

Identification module 104 may identify the deduplicated data system in a variety of contexts. For example, identification module 104 may execute on a portion of a deduplicated data system. FIG. 4 is a block diagram of an exemplary system 400 for protecting deduplicated data. As illustrated in FIG. 4, a storage pool 430 may include components of a deduplicated data system that provides storage to a backup system 420 and/or a plurality of primary volumes 410, such as a metadata database 432 and a content router 436. Content router 436 may include modules 102. Accordingly, identification module 104 may identify the deduplicated data system by executing on content router 436.

Returning to FIG. 3, at step 304 one or more of the systems described herein may identify a tiered storage system for storing deduplicated data objects of the deduplicated data system. For example, at step 304 identification module 104 may, as part of computing system 202 in FIG. 2, identify tiered storage system 206 for storing deduplicated data objects 210(1)-(m) of deduplicated data system 210. Using FIG. 4 as an additional example, at step 304 identification module 104 may, as part of content router 436, identify tiered storage system 438.

As mentioned earlier, the deduplicated objects of the deduplicated data system may include deduplicated files (e.g., multiple users may own and store identical files, which may be replaced with a reference to a single unique copy). Additionally or alternatively, the deduplicated objects may include deduplicated data segments. The data segments may include data strings of arbitrary length, and/or data blocks of a fixed length.

As used herein, the term "tiered storage system" may refer to any storage system (e.g., a file system and/or appliance) using virtual and/or physical storage devices with different characteristics to provide differentiated storage. For example, the tiered storage system may be tiered by storage device reliability. Accordingly, data with a higher level of priority may be stored on a high tier to ensure that the data is not lost. In some additional examples, storage devices of a tiered storage system may provide different input/output performance, provide different security features (e.g., via encryption, tamper-proofing, etc.), different data availability, etc. As will be described in greater detail below, the systems described herein may use these and/or any other tiering criteria when storing deduplicated objects.

Identification module 104 may perform step 304 in any suitable manner. For example, identification module 104 may identify the tiered storage system by detecting a device providing tiered storage services. Additionally or alternatively, identification module 104 may identify the tiered storage system by reading a configuration file that identifies the tiered storage system. In some examples, identification module 104 may receive a message that identifies the tiered storage system.

Returning to FIG. 3, at step 306 one or more of the systems described herein may assign a level of priority to at least one deduplicated object within the deduplicated data system based on at least one property of the deduplicated object. For example, at step 306 prioritization module 106 may, as part of computing system 202 in FIG. 2, assign a level of priority to deduplicated object 210(1) based on at least one property of deduplicated object 210(1). Using FIG. 4 as an additional example, at step 306 prioritization module 106 may, as part of content router 436, assign a level of priority to at least one deduplicated object to be stored with tiered storage system 438.

As used herein, the phrase "level of priority" may refer to any score, ordering, and/or algorithmic result for differentiating data to store on one or more tiers of a tiered storage system. As mentioned above, prioritization module 106 may assign the level of priority based on one or more properties of the deduplicated data object. As will be explained in greater detail below, in some examples prioritization module 106 may assign the level of priority based on a property relating to the deduplication of the deduplicated object. Additionally or alternatively, prioritization module 106 may assign the level of priority based on a property relating to a file that references the deduplicated object.

Figure 5:
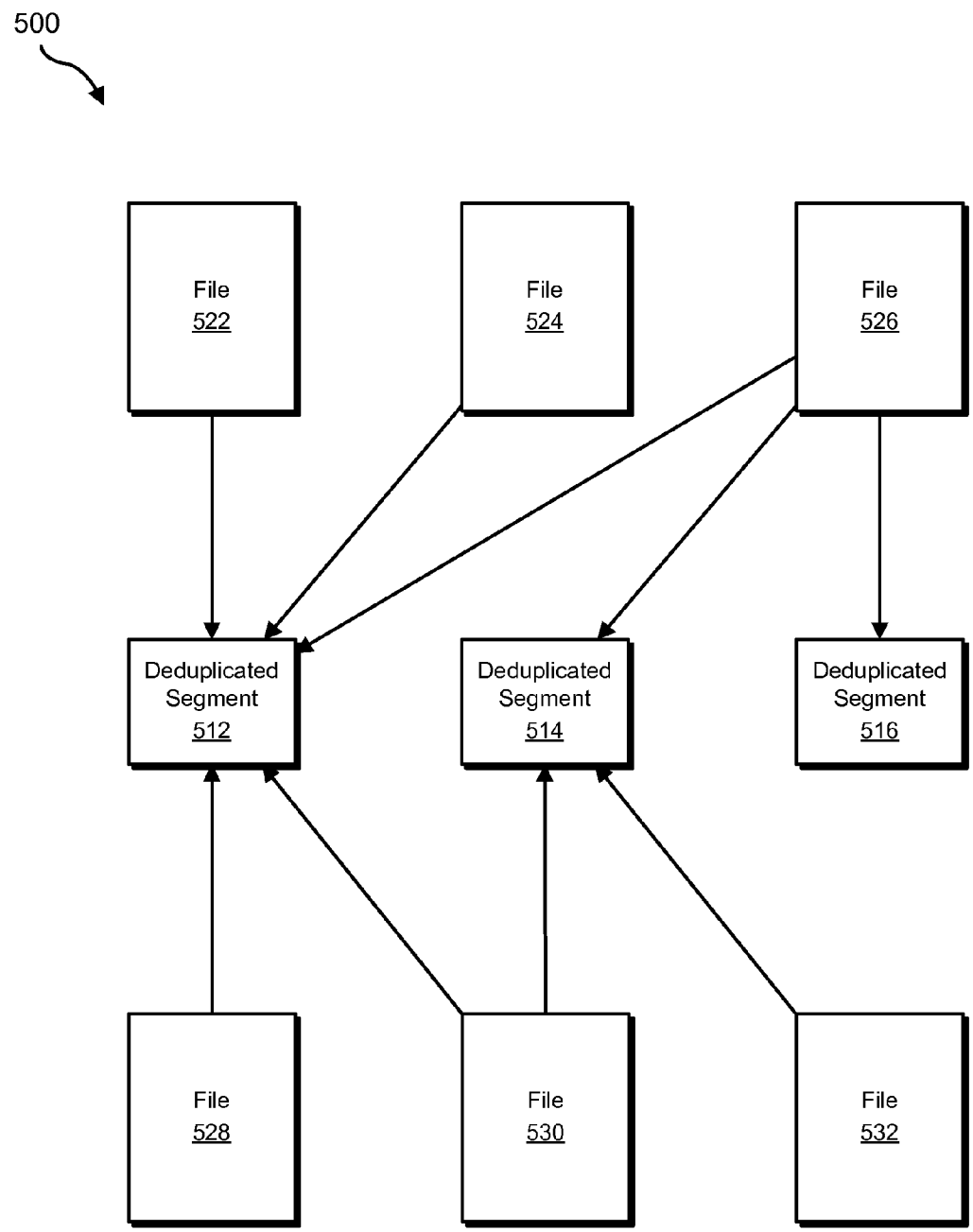
FIG. 5 is a block diagram of an exemplary deduplicated data system.

In some examples, the property may include a reference count of the deduplicated object. For example, the property may include a count of the number of files within the deduplicated data system that reference the deduplicated object. Additionally or alternatively, the property may include the number of times that the deduplicated object is referenced by a file within the deduplicated data system (e.g., counting multiple references by a single file). FIG. 5 is a block diagram of an exemplary deduplicated data system 500. Using FIG. 5 as an example, deduplicated data system 500 may include files 522, 524, 526, 528, 530, and 532, each of which may reference one or more of deduplicated segments 512, 514, and 516. For example, deduplicated segment 512 may be referenced five times (by files 522, 524, 526, 528, and 530). Likewise, deduplicated segment 514 may be referenced three times (by files 526, 530, and 532) and deduplicated segment 516 may be referenced once (by file 526). In some examples, prioritization module 106 may assign a higher level of priority to deduplicated segment 512 than to deduplicated segment 514 or deduplicated segment 516 at least in part because deduplicated data segment 512 has a higher reference count than deduplicated data segments 514 and 516.

If the deduplicated data system is deduplicated by file (e.g., the deduplicated object corresponds to a deduplicated file instead of a deduplicated segment), the reference count may include the number of users that own and/or have stored the deduplicated object. Additionally or alternatively, the reference count may include the number of times that the deduplicated object appears within the deduplicated data system (e.g., including in the count multiple instances of the file per user).

Returning to step 306, in some examples the property may include a measurement of how long ago a reference count of the deduplicated object changed. For example, prioritization module 106 may assign a level of priority to the deduplicated object based on the number of days passed since the last time that the reference count of the deduplicated object changed. In this example, prioritization module 106 may, for instance, assign a lower level of priority to a deduplicated object whose reference count has not changed in the last 90 days.

In some examples, the property may include an access time of the deduplicated object. For example, prioritization module 106 may assign a level of priority to the deduplicated object based on how much time has passed since the last time the deduplicated object has been accessed. Additionally or alternatively, prioritization module 106 may assign a level of priority to the deduplicated object based on how many times the deduplicated object has been accessed within a predetermined period of time. The access time may depend on a variety of types of access. For example, the access time may record a read operation on the deduplicated object, a read operation on a file referencing the deduplicated object, a write operation creating the deduplicated object, and/or a write operation on a file referencing the deduplicated object.

In some additional examples, the property may include a user-assigned priority. For example, prioritization module 106 may assign a level of priority to the deduplicated object based on a priority assigned by an owner of an instance of the deduplicated object and/or a file that references the deduplicated object. In some examples, multiple users may assign a priority pertaining to the deduplicated object. In these examples, prioritization module 106 may aggregate the assignments made by the multiple users in any suitable manner (e.g., by using the highest priority level assigned by any user, by adding priority levels assigned by users, by counting the number of users assigning a high priority to the deduplicated object, etc.).

The property also may include a priority of at least one owner of the deduplicated object. For example, prioritization module 106 may assign a level of priority to the deduplicated object based on a priority assigned to a user that owns an instance of the deduplicated object and/or owns a file that references the deduplicated object. For example, the account of a member of the board of directors of an organization may carry a higher priority than the account of an associate software engineer within the organization. Accordingly, prioritization module 106 may assign a higher level of priority to the deduplicated object if an instance of the deduplicated object is owned by the member of the board of directors and/or a file owned by the member of the board of directors references the deduplicated object.

Generally, prioritization module 106 may use and/or combine any of the above-described properties to assign the level of priority. In some examples, prioritization module 106 may subject one or more of the above-described properties to thresholds and/or more complex formulae and/or algorithms in order to determine the level of priority.

Prioritization module 106 may assign the level of priority in a variety of ways. In some examples, prioritization module 106 may assign the level of priority to the deduplicated object by calculating a score for the deduplicated object. Additionally or alternatively, prioritization module 106 may assign the level of priority by classifying the deduplicated object. As will be described in greater detail below, the systems described herein may select a storage tier for the deduplicated object based on the level of priority. In some examples, the level of priority may correspond directly with the storage tier (e.g., levels of priority assigned by prioritization module 106 may have a 1-to-1 correspondence with storage tiers within the tiered storage system).

Returning to FIG. 3, at step 308 one or more of the systems described herein may select a storage tier within the tiered storage system for storing the deduplicated object based on the level of priority. For example, at step 308 prioritization module 106 may, as part of computing system 202 in FIG. 2, select storage tier 206(1) for storing deduplicated object 210(1) based on the level of priority assigned to deduplicated object 210(1). Using FIG. 4 as an additional example, at step 308 prioritization module 106 may, as part of content router 436, select tier 438(2) of tiered storage system 438 for storing the deduplicated object.

As used herein, the term "storage tier" may refer to any storage destination within a tiered storage system. In some examples, a high storage tier may provide one or more superior storage features vis-à-vis a low storage tier. For example, a high storage tier may provide superior reliability, input/output performance, data availability, security features, etc.

In some examples, the storage tier may include a physical storage device. Additionally or alternatively, the storage tier may include a logical storage device. For example, the logical storage device may include a virtual storage device. The virtual storage device may be configured to provide storage capabilities as required by the storage tier. In some examples, the virtual storage device may provide redundant storage.

Prioritization module 106 may perform step 308 in any suitable manner. For example, prioritization module 106 may map the level of priority onto a storage tier using a preconfigured table. Additionally or alternatively, prioritization module 106 may select the storage tier based on a combination of the level of priority and storage availability within one or more storage tiers within the tiered storage system. As mentioned earlier, in some examples the level of priority may correspond directly with the tiered storage system (e.g., in a 1-to-1 correspondence). In these examples, prioritization module 106 may select the storage tier simply by using the level of priority.

Returning to FIG. 3, at step 310 one or more of the systems described herein may store the deduplicated object within the selected storage tier. For example, at step 310 storage module 108 may, as part of computing system 202 in FIG. 2, select store deduplicated object 210(1) within storage tier 206(1). Using FIG. 4 as an additional example, at step 310 storage module 108 may, as part of content router 436, store the deduplicated object within storage tier 438(2).

Storage module 108 may perform step 310 in a variety of contexts. For example, storage module 108 may store the deduplicated object when the deduplicated object is created within the deduplicated data system. Additionally or alternatively, storage module 108 may store the deduplicated object as a part of backing up the deduplicated object. Accordingly, storage module 108 may store the deduplicated object by backing up the deduplicated object to the storage tier. In some examples, storage module 108 may store the deduplicated object within the selected storage tier as a part of moving the deduplicated object from a different storage tier. For example, the level of priority of the deduplicated object may have changed, requiring that the deduplicated object move to a higher or lower storage tier.

By dynamically storing deduplicated data objects in different storage tiers based on the priority of each deduplicated data object, the systems and methods described herein may increase the reliability of deduplicated storage (e.g., by storing a highly-referenced data segment in a more reliable storage tier) without the costs associated with duplicating the deduplicated data.

Figure 6:
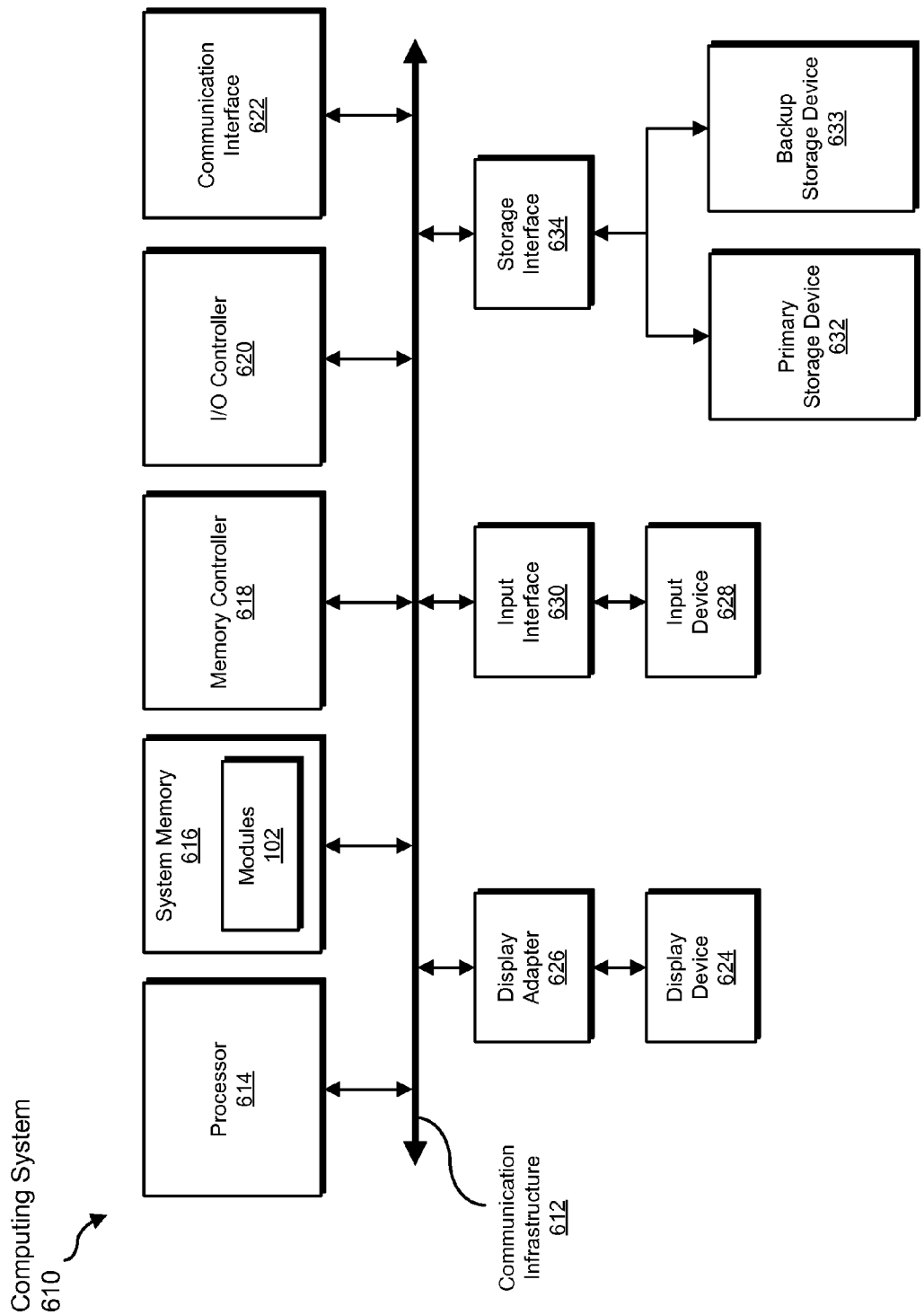
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, assigning, selecting, storing, and/or backing up steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, assigning, selecting, storing, and/or backing up.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, assigning, selecting, storing, and/or backing up steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, assigning, selecting, storing, and/or backing up steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, assigning, selecting, storing, and/or backing up steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, assigning, selecting, storing, and/or backing up steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
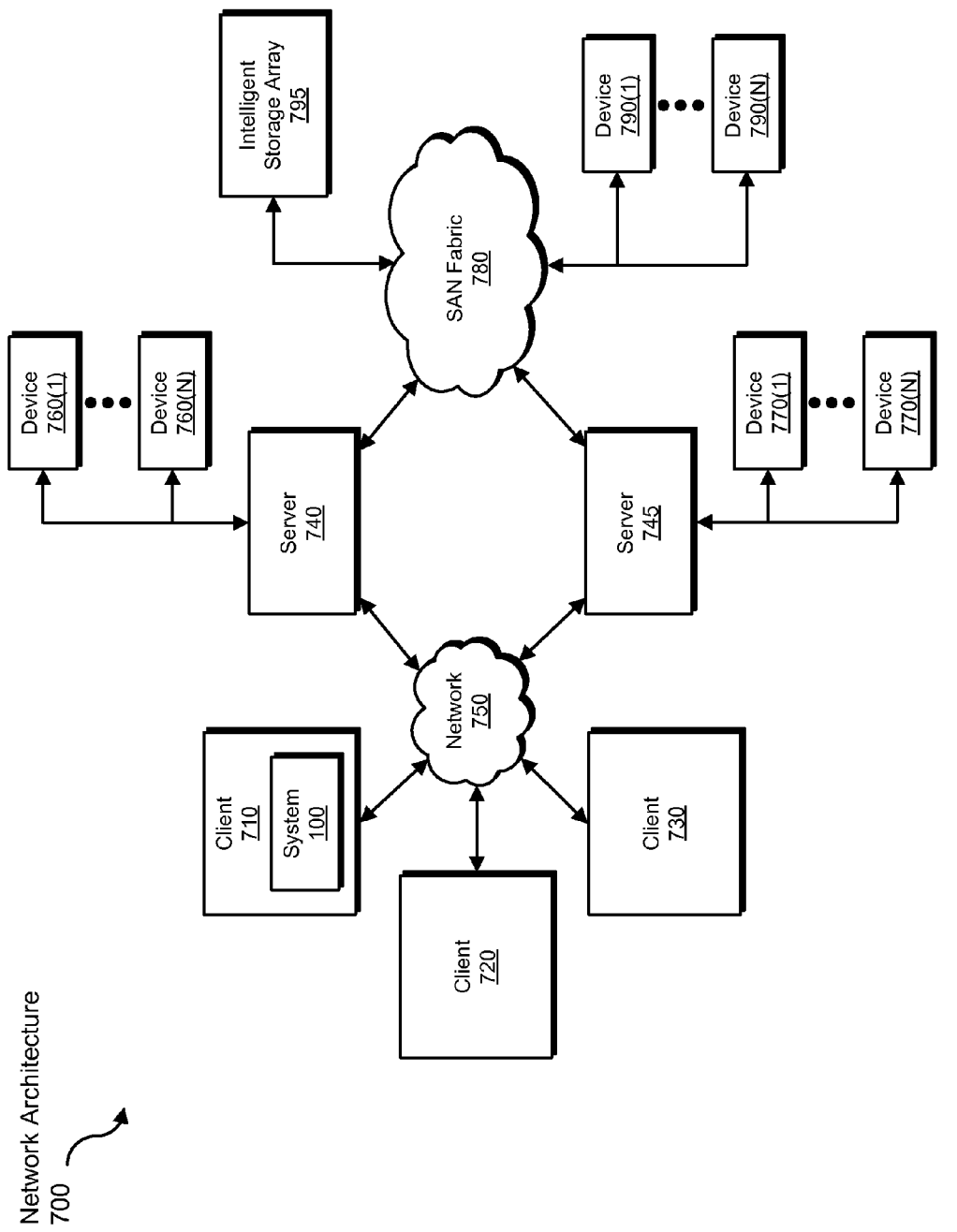
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, assigning, selecting, storing, and/or backing up steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for protecting deduplicated data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a deduplicated data system into an efficiently stored deduplicated data system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting deduplicated data, at least a portion of the method being performed by a computing device comprising at least one processor, the method comprising:

identifying a deduplicated data system that deduplicates data by only storing a single instance of each multiply-referenced data object;

identifying a tiered storage system for storing deduplicated objects of the deduplicated data system;

assigning a level of priority to at least one deduplicated object within the deduplicated data system based on a reference count of the deduplicated object, wherein:

assigning the level of priority based on the reference count comprises assigning the level of priority based on a number of unique users that own the deduplicated object;

assigning the level of priority based on the number of unique users that own the deduplicated object comprises assigning a higher level of priority to the deduplicated object than to an additional deduplicated object at least in part because the deduplicated object has a higher number of unique users than the additional deduplicated object;

selecting a storage tier within the tiered storage system for storing the deduplicated object based on the level of priority;

storing the deduplicated object within the selected storage tier.

2. The computer-implemented method of claim 1, wherein the deduplicated object comprises at least one of:
   a deduplicated file;
   a deduplicated data segment.

3. The computer-implemented method of claim 1, wherein assigning the level of priority to the deduplicated object based on the reference count of the deduplicated object comprises assigning the level of priority to the deduplicated object based additionally on a number of files within the deduplicated data system that reference the deduplicated object.

4. The computer-implemented method of claim 1, wherein assigning the level of priority to the deduplicated object based on the reference count of the deduplicated object comprises assigning the level of priority to the deduplicated object based additionally on a measurement of how long ago the reference count of the deduplicated object changed.

5. The computer-implemented method of claim 1, wherein:
   assigning the level of priority to the deduplicated object based on the reference count of the deduplicated object comprises assigning the level of priority to the deduplicated object based additionally on a number of times that the deduplicated object is reference by a file within the deduplicated data system;
   at least one file within the deduplicated data system references the deduplicated object multiple times.

6. The computer-implemented method of claim 1, wherein the selected storage tier comprises at least one of:
   a physical storage device;
   a logical storage device;
   a virtual storage device that provides redundant storage.

7. The computer-implemented method of claim 1, wherein assigning the level of priority to the deduplicated object based on the reference count of the deduplicated object comprises assigning the level of priority to the deduplicated object based additionally on an access time for a read operation on the deduplicated object.

8. The computer-implemented method of claim 7, wherein the access time for the read operation on the deduplicated object comprises at least one of:
   how much time has passed since the last read operation;
   how many times the read operation has been performed within a predetermined period of time.

9. The computer-implemented method of claim 1, wherein the tiered storage system is tiered by storage device reliability.

10. The computer-implemented method of claim 1, wherein storing the deduplicated object within the selected storage tier comprises backing up the deduplicated object to the storage tier.

11. A system for protecting deduplicated data, the system comprising:
an identification module programmed to:
identify a deduplicated data system that deduplicates data by only storing a single instance of each multiply-referenced data object;
identify a tiered storage system for storing deduplicated objects of the deduplicated data system;
a prioritization module programmed to:
assign a level of priority to at least one deduplicated object within the deduplicated data system based on a reference count of the deduplicated object, wherein:
the prioritization module is programmed to assign the level of priority based on the reference count by assigning the level of priority based on a number of unique users that own the deduplicated object;
the prioritization module is programmed to assign the level of priority based on the number of unique users that own the deduplicated object by assigning a higher level of priority to the deduplicated object than to an additional deduplicated object at least in part because the deduplicated object has a higher number of unique users than the additional deduplicated object;
select a storage tier within the tiered storage system for storing the deduplicated object based on the level of priority;
a storage module programmed to store the deduplicated object within the selected storage tier;
at least one processor configured to execute the identification module, the prioritization module, and the storage module.

12. The system of claim 11, wherein the deduplicated object comprises at least one of:
a deduplicated file;
a deduplicated data segment.

13. The system of claim 11, wherein the prioritization module is programmed to assign the level of priority to the deduplicated object based on the reference count of the deduplicated object by assigning the level of priority to the deduplicated object based additionally on a number of files within the deduplicated data system that reference the deduplicated object.

14. The system of claim 11, wherein the prioritization module is programmed to assign the level of priority to the deduplicated object based on the reference count of the deduplicated object by assigning the level of priority to the deduplicated object based additionally on a measurement of how long ago the reference count of the deduplicated object changed.

15. The system of claim 11, wherein:
the prioritization module is programmed to assign the level of priority to the deduplicated object based on the reference count of the deduplicated object by assigning the level of priority to the deduplicated object based additionally on a number of times that the deduplicated object is reference by a file within the deduplicated data system;
at least one file within the deduplicated data system references the deduplicated object multiple times.

16. The system of claim 11, wherein the prioritization module is programmed to assign the level of priority to the deduplicated object based additionally on a priority of at least one owner of a file within the deduplicated data system that references the deduplicated object.

17. The system of claim 11, wherein the selected storage tier comprises at least one of:
a physical storage device;
a logical storage device.

18. The system of claim 11, wherein the tiered storage system is tiered by storage device reliability.

19. The system of claim 11, wherein the prioritization module is programmed to assign the level of priority to the deduplicated object based additionally on a user-assigned priority comprising an aggregation of assignments of priority made by a plurality of users.

20. A non-transitory computer-readable-storage medium comprising one or more computer-executable instructions that, when executed by at least one processor of a computing device, cause the computing device to:
identify a deduplicated data system that deduplicates data by only storing a single instance of each multiply-referenced data object;
identify a tiered storage system for storing deduplicated objects of the deduplicated data system;
assign a level of priority to at least one deduplicated object within the deduplicated data system based on a reference count of the deduplicated object by assigning the level of priority based on a number of unique users that own the deduplicated object, wherein assigning the level of priority based on the number of unique users comprises assigning a higher level of priority to the deduplicated object than to an additional deduplicated object at least in part because the deduplicated object has a higher number of unique users than the additional deduplicated object;
select a storage tier within the tiered storage system for storing the deduplicated object based on the level of priority;
store the deduplicated object within the selected storage tier.

* * * * *